US010934045B2

(12) United States Patent
Beach

(10) Patent No.: US 10,934,045 B2
(45) Date of Patent: Mar. 2, 2021

(54) METHOD AND APPARATUS FOR LABELING OF SUPPORT STRUCTURES

(71) Applicant: Zebra Technologies Corporation, Lincolnshire, IL (US)

(72) Inventor: Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 122 days.

(21) Appl. No.: 16/047,220

(22) Filed: Jul. 27, 2018

(65) Prior Publication Data

US 2020/0031513 A1 Jan. 30, 2020

(51) Int. Cl.
*B32B 41/00* (2006.01)
*B65C 9/00* (2006.01)
(Continued)

(52) U.S. Cl.
CPC ............ *B65C 9/0015* (2013.01); *B65C 1/021* (2013.01); *B65C 9/26* (2013.01); *B65C 9/40* (2013.01); *B65C 2009/0059* (2013.01)

(58) Field of Classification Search
CPC ........... B65C 9/0015; B65C 9/26; B65C 9/40; B65C 1/021; B65C 2009/0059
(Continued)

(56) References Cited

U.S. PATENT DOCUMENTS 5,423,617 A 6/1995 Marsh et al.
5,674,335 A * 10/1997 Aman .................... B41J 3/4073 156/363

(Continued)

FOREIGN PATENT DOCUMENTS

CN 105857813 A 8/2016
CN 206952978 U 2/2018

(Continued)

OTHER PUBLICATIONS

International Search Report and Written Opinion for International Application No. PCT/US2019/034561 dated Aug. 9, 2019.

(Continued)

*Primary Examiner* — Michael N Orlando
*Assistant Examiner* — Joshel Rivera
(74) *Attorney, Agent, or Firm* — Yuri Astvatsaturov

(57) ABSTRACT

An apparatus for labeling support structures includes: a chassis having a locomotive assembly, and supporting a label generator and an effector assembly with an end movable relative to the chassis and carrying a label manipulator with an image sensor; a controller coupled to the locomotive assembly, label generator, effector assembly and label manipulator, and configured to: obtain label placement data defining a location relative to a support structure reference feature for replacement of a previous label with a new label; control the locomotive assembly to travel to the support structure; detect the reference feature via image data captured at the image sensor; control the effector assembly to place the label manipulator at the location relative to the reference feature; control the effector assembly and the label manipulator to remove and discard the previous label, retrieve the new label from the label generator, and place the new label at the location.

21 Claims, 10 Drawing Sheets

(51) Int. Cl.
*B65C 1/02* (2006.01)
*B65C 9/40* (2006.01)
*B65C 9/26* (2006.01)

(58) Field of Classification Search
USPC .......................... 156/64, 350, 351, 378, 379
See application file for complete search history.

(56) References Cited

U.S. PATENT DOCUMENTS

| | | | |
|---|---|---|---|
| 5,704,049 | A | 12/1997 | Briechle |
| 2006/0279527 | A1 | 12/2006 | Zehner et al. |
| 2009/0314413 | A1 | 12/2009 | Brandow et al. |
| 2012/0197439 | A1 | 8/2012 | Wang et al. |
| 2013/0076586 | A1 | 3/2013 | Karhuketo et al. |
| 2015/0363625 | A1 | 12/2015 | Wu et al. |
| 2017/0032311 | A1 | 2/2017 | Rizzolo et al. |
| 2017/0286773 | A1 | 10/2017 | Skaff et al. |
| 2017/0323253 | A1 | 11/2017 | Enssle et al. |
| 2018/0001481 | A1 | 1/2018 | Shah et al. |
| 2018/0088586 | A1 | 3/2018 | Hance et al. |
| 2018/0101813 | A1 | 4/2018 | Paat et al. |
| 2018/0108120 | A1 | 4/2018 | Venable et al. |
| 2018/0130011 | A1 | 5/2018 | Jacobsson |
| 2018/0190160 | A1 | 7/2018 | Bryan et al. |
| 2018/0293543 | A1 | 10/2018 | Tiwari et al. |
| 2019/0077015 | A1 | 3/2019 | Shibasaki et al. |
| 2019/0389078 | A1 | 12/2019 | Bartlett et al. |
| 2020/0147802 | A1 | 5/2020 | Beach |
| 2020/0147803 | A1 | 5/2020 | Beach |

FOREIGN PATENT DOCUMENTS

| | | | |
|---|---|---|---|
| WO | 9725204 | A1 | 7/1997 |
| WO | 2017/187106 | A1 | 11/2017 |

OTHER PUBLICATIONS

International Search Report and Written Opinion for International Patent Application No. PCT/US2019/051312 dated Nov. 15, 2019.

Meyersohn. Walmart turns to robots and apps in stores, Dec. 7, 2018, retrieved from the Internet at [URL: https://www.cnn.com/2018/12/07/business/walmart-robot-janitors-dotcom-store/index.html] dated Oct. 29, 2019.

International Search Report and Written Opinion for International Patent Application No. PCT/US2019/054103 dated Jun. 1, 2020.

* cited by examiner

METHOD AND APPARATUS FOR LABELING OF SUPPORT STRUCTURES

BACKGROUND

Environments in which inventories of objects are managed, such as products for purchase in a retail environment, may be complex and fluid. A retail facility may contain a wide variety of products disposed on support structures such as shelves, which bear labels containing product information such as prices, barcodes and the like. The placement of products within the facility, the selection of products on the shelves, and the formatting of the labels, may all change over time, requiring previous labels to be replaced with new labels. The replacement of labels is typically performed manually, in a time-consuming and error-prone process. Similar issues may be present in other environments in which inventoried objects are managed, such as in warehouse environments.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
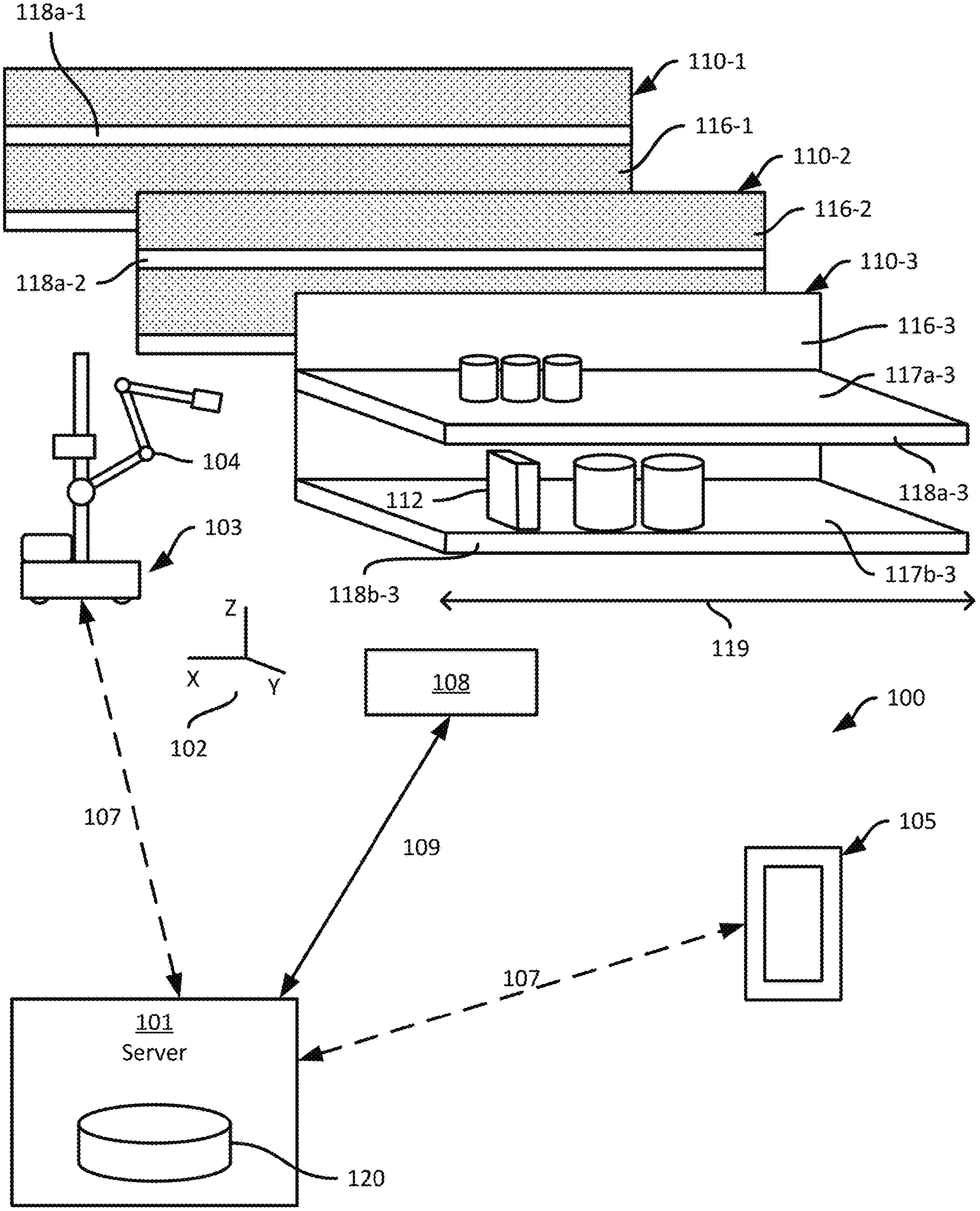
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an apparatus for labeling support structures, comprising: a chassis having a locomotive assembly; a label generator supported on the chassis; an effector assembly having a first end coupled to the chassis and a second end movable relative to the chassis; a label manipulator disposed at the second end of the effector assembly, the label manipulator including an image sensor; a controller coupled to the locomotive assembly, the label generator, the effector assembly and the label manipulator, the controller configured to: obtain label placement data defining a location relative to a reference feature on a support structure for a label manipulation operation; control the locomotive assembly to travel to the support structure; detect the reference feature via image data captured at the image sensor; control the effector assembly to place the label manipulator at the location relative to the reference feature; control the effector assembly and the label manipulator to perform the label manipulation operation.

Additional examples disclosed herein are directed to a method for labeling support structures, comprising: at a controller of an apparatus including a chassis supporting (i) a locomotive assembly, (ii) a label generator, (iii) an effector assembly having a first end coupled to the chassis and a second end movable relative to the chassis and (iv) a label manipulator disposed at the second end of the effector assembly and including an image sensor: obtaining label placement data defining a location relative to a reference feature on a support structure for a label manipulation operation; controlling the locomotive assembly to travel to the support structure; detecting the reference feature via image data captured at the image sensor; controlling the effector assembly to place the label manipulator at the location relative to the reference feature; and controlling the effector assembly and the label manipulator to perform the label manipulation operation.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link. As those of ordinary skill in the art will realize, alternatively or in addition to the retail environment, embodiments of the present disclosure may be implemented in a variety of environments in which inventoried objects are managed, such as in a warehouse environment.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures in the form of shelf modules 110-1, 110-2, 110-3 and so on (collectively referred to as shelf modules 110, and generically referred to as a shelf module 110—this nomenclature is also employed for other elements discussed herein). Various other support structures for supporting inventoried retail and/or warehouse items disposed thereon are contemplated, including shelves, racks (including racks for hanging inventoried objects, such as clothing racks), peg boards, and the like.

Each shelf module 110 supports a plurality of products 112. Each shelf module 110 includes a shelf back 116-1, 116-2, 116-3 and one or more support surfaces (e.g. an upper support surface 117*a*-3 and a lower support surface 117*b*-3 as illustrated in FIG. 1) extending from the shelf back 116 to a respective shelf edge (e.g. shelf edges 118*a*-1, 118*a*-2, 118*a*-3 and 118*b*-3). The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. The shelf edges 118 typically bear labels, such as adhesive labels affixed to the shelf edges 118, corresponding to the products 112 and therefore including information such as product names, barcodes or other machine-readable indicators, prices, and the like.

As will be apparent from FIG. 1, the term "shelf edge" 118 as employed herein, which may also be referred to as the edge of a support surface of a support structure (e.g., the support surfaces 117) refers to a surface bounded by adjacent surfaces having different angles of inclination. In the example illustrated in FIG. 1, the shelf edges 118*a*-3 is at an angle of about ninety degrees relative to each of the support surface 117*a*-3 and the underside (not shown) of the support surface 117*a*-3. In other examples, the angles between the shelf edges 118 and the adjacent surfaces, such as the support surfaces 117, is more or less than ninety degrees.

In the illustrated embodiment, the apparatus 103 is deployed within the retail environment, and communicates with the server 101 (e.g. via the link 107) to navigate, autonomously or partially autonomously, along a length 119 of at least a portion of the shelf modules 110. The apparatus 103 is configured to navigate among the shelf modules 110, for example according to a frame of reference 102 established within the retail environment. The frame of reference 102 can also be referred to as a global frame of reference. The apparatus 103 is configured, during such navigation, to track the location of the apparatus 103 relative to the frame of reference 102. In other words, the apparatus 103 is configured to perform localization. The apparatus 103 is equipped with one or more navigation sensors, including but not limited to image sensors, depth sensors, as well as gyroscopes and/or accelerometers, enabling the apparatus 103 to navigate within the environment.

The apparatus 103 also includes an effector assembly 104 bearing a label manipulator, to be discussed in greater detail below. The apparatus 103 is configured, for example responsive to commands received from the server 101, to navigate among the shelf modules 110 and replace the above-mentioned labels affixed to the shelf edges 118 with the effector assembly 104 and associated components. For example, certain labels may require periodic replacement to reflect updated prices, reallocation of products 112 among the shelf modules 110, and the like. The server 101 includes a memory storing a repository 120 containing label placement data, for example in the form of a planogram indicating the locations (e.g. in the frame of reference 102) of each shelf module 110, as well as the location of each label on each shelf module. Label locations may be expressed in the repository 120 as a distance along a specified shelf edge 118 relative to a reference feature of the module 110, such as a boundary of the module 110 (e.g. the left side of the module 110). The label placement data in the repository 120 can also contain further data defining each label, such as the label type (i.e. the physical format of the label), the product identifier corresponding to the label, and the like.

Figure 2A:
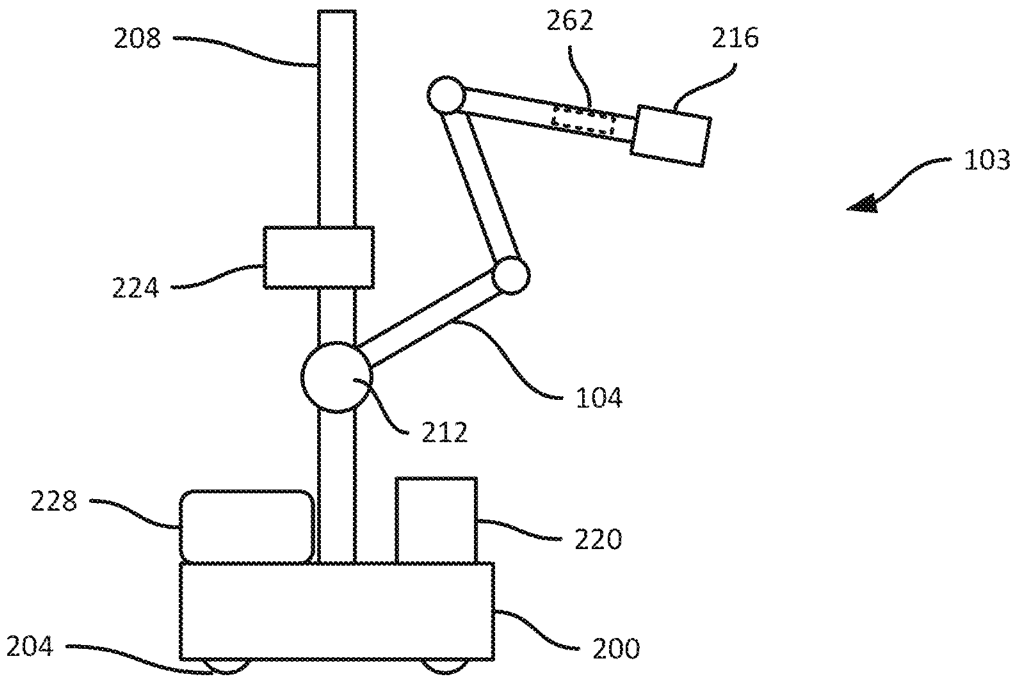
FIG. 2A depicts a mobile automation apparatus in the system of FIG. 1.
Figure 2B:
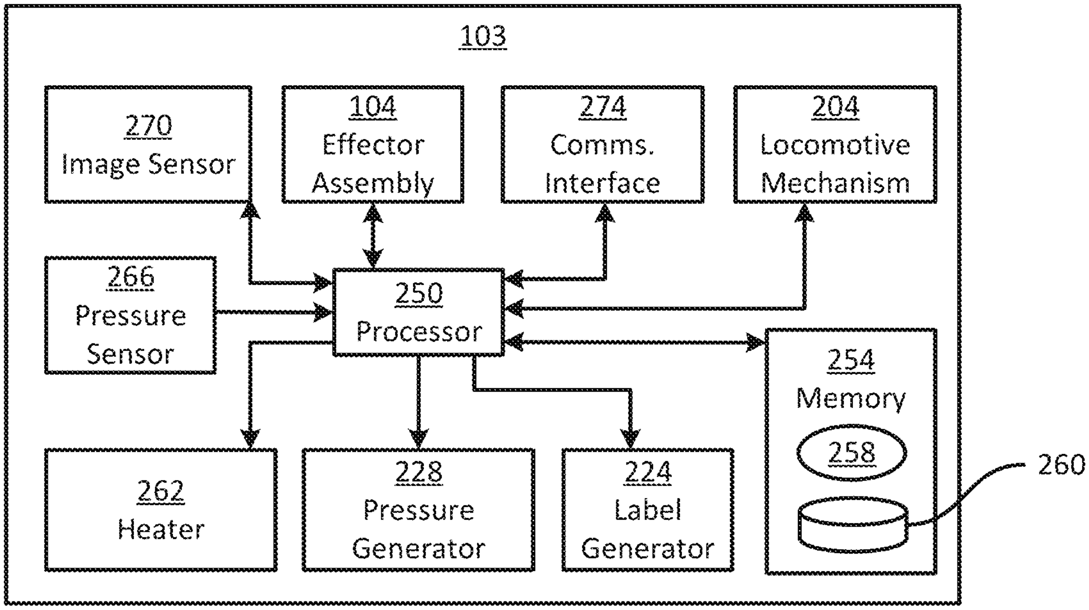
FIG. 2B is a block diagram of certain internal components of the mobile automation apparatus in the system of FIG. 1.

Turning now to FIGS. 2A and 2B, the mobile automation apparatus 103 is shown in greater detail. Referring to FIG. 2A, the apparatus 103 includes a chassis 200 containing a locomotive mechanism 204 (e.g. one or more electrical motors driving wheels, tracks or the like). The chassis 200 supports additional components of the apparatus 103, including a mast 208 which in turn supports the effector assembly 104. The effector assembly 104, in the present example, is a robotic arm fixed to the chassis 200 (via the mast 208) at a first end 212. A second end of the effector assembly 104 is movable relative to the chassis 200, for example with six degrees of freedom (e.g. translations in three dimensions, as well as roll, pitch and yaw angles). The second end of the effector assembly 104 carries a label manipulator 216. As will be discussed in greater detail below, the label manipulator 216 is configured to grasp labels and to release labels, as well as to capture data (e.g. image data) for use in positioning the manipulator 216 via control of the effector assembly 104.

The apparatus 103 also includes a receptacle 220 for receiving discarded labels removed from shelf edges 118 by the manipulator 216. The apparatus 103 further includes a label generator 224 for generating new labels for placement on the shelf edges 118 via control of the effector assembly 104 and the manipulator 216. The label generator 224, in the present example, is a label printer containing, for example, a roll of blank adhesive-backed labels and a printhead configured to apply pigmentation (e.g. ink, thermally-induced pigment changes in the blank labels, or the like) to blank labels. Embodiments of the printer 224 include a direct thermal printer and a thermal transfer printer. The printer 224 can be configured to remove the backing from printed labels as the labels exit the printer 224. In other examples, the label generator 224 can include a supply of previously printed (or otherwise previously generated) labels, and is configured to simply dispense the previously generated labels via an outlet.

The apparatus 103 also includes a pressure generator 228 configured to supply one or both of a vacuum (i.e. negative pressure) or pressurized air to the manipulator 216 to allow the manipulator 216 to grasp and release labels. The generator 228 can be implemented as a plurality of distinct components, such as one or more pumps and associated storage tanks (e.g. air storage tanks).

The apparatus 103 also includes components for controlling and interacting with the above components to replace labels on the shelf edges 118. Turning to FIG. 2B, the apparatus 103 includes a special-purpose controller, such as a processor 250 interconnected with a non-transitory computer readable storage medium, such as a memory 254. The memory 254 includes a combination of volatile memory (e.g. Random Access Memory or RAM) and non-volatile memory (e.g. read only memory or ROM, Electrically Erasable Programmable Read Only Memory or EEPROM, flash memory). The processor 250 and the memory 254 each comprise one or more integrated circuits.

The memory 254 stores computer readable instructions for execution by the processor 250. In particular, the memory 254 stores a control application 258 which, when executed by the processor 250, configures the processor 250 to perform various functions discussed below in greater detail and related to the navigation of the apparatus 103 (e.g. by controlling the locomotive mechanism 203). The application 258 may also be implemented as a suite of distinct applications in other examples. The processor 250, when so configured by the execution of the application 258, may also be referred to as a controller 250. Those skilled in the art will appreciate that the functionality implemented by the processor 250 via the execution of the application 258 may also be implemented by one or more specially designed hardware and firmware components, such as FPGAs, ASICs and the like in other embodiments.

The memory 254 also stores a repository 260 containing, for example, a map of the environment in which the apparatus 103 is deployed, for use in navigation among the shelf modules 110. The apparatus 103 may communicate with the server 101, for example to receive instructions to navigate to specified locations (e.g. to a given aisle consisting of a set of modules 110) and initiate label replacement operations. Navigation to the specified module 110 is implemented by the apparatus 103 based in part on the above-mentioned map. The repository 260 can also contain label placement data (e.g. received from the server 101) for use in replacing labels on the shelf modules 110.

As shown in FIG. 2B, the processor 250 is connected to the effector assembly 104 and the pressure generator 228. The processor 250 is enabled, via such connections, to issue commands to the effector assembly 104 to control the position of the label manipulator 216 relative to the chassis 200, and to enable the pressure generator 228 to generate positive or negative air pressure for application at the manipulator 216.

In addition, the apparatus 103 includes a heater 262, such as an inline heater mounted within an air conduit between the pressure generator 228 and the manipulator 216, permitting the manipulator 216 to emit pressurized heated air in order to remove adhesive labels from shelf edges 118. In other examples, additional label removal mechanisms can be deployed via the apparatus 103 in addition to or instead of the heater 262, depending on the nature of the adhesives employed in labels on the shelf edges 118. For example, the apparatus 103 can include a cooler for cooling pressurized air from the pressure generator 228, a lamp in the manipulator 216 to illuminate labels to disrupt adhesives (e.g. ultraviolet or near-ultraviolet light to chemically disrupt certain adhesives, with infrared or near-infrared light to soften adhesives by heating the adhesives, or the like).

The apparatus 103 can also include a pressure sensor 266, for example mounted within the manipulator 216 or within an air conduit running between the generator 228 and the manipulator 216. The pressure sensor 266 is configured to provide pressure measurements to the processor 250, and the processor 250 is configured to detect, based at least in part on comparing the pressure measurements to a predetermined pressure threshold required to grasp the label, whether a label is currently grasped by the manipulator 216.

The apparatus 103 further includes an image sensor 270 connected with the processor 250. The image sensor 270, which can be for example a digital color camera (e.g. configured to generate RGB images), a greyscale camera, an infrared camera or the like, is implemented as a component of the manipulator 216, as will be discussed in greater detail below. The image sensor 270 is controllable by the processor 250 to capture images of the shelf modules 110 in order to locate the manipulator 216 and manipulate labels on the shelf edges 118.

The apparatus 103 also includes a communications interface 274 enabling the apparatus 103 to communicate with other computing devices, such as the server 101 over the link 107 shown in FIG. 1. The communications interface 274 also enables the apparatus 103 to communicate with the server 101 via the dock 108 and the link 109.

Figure 3A:
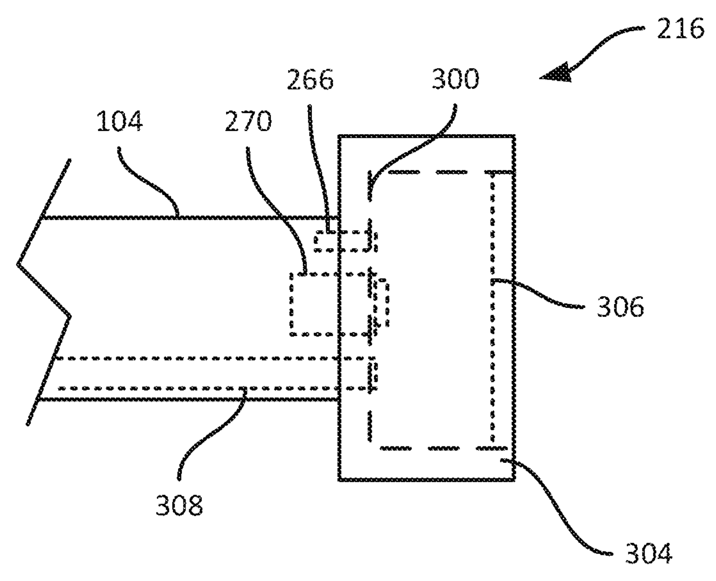
FIGS. 3A and 3B are top and front views, respectively, of a label manipulator of the mobile automation apparatus in the system of FIG. 1.
Figure 3B:
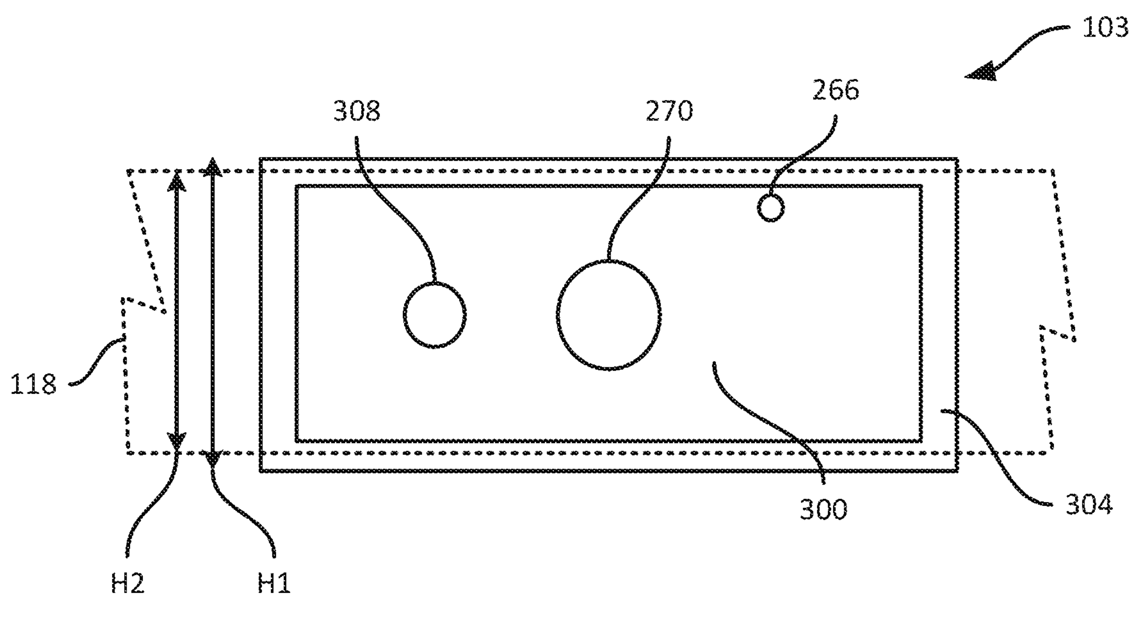

Turning to FIGS. 3A and 3B, the manipulator 216 is shown in greater detail. In particular, FIG. 3A illustrates a top view of the manipulator 216, when the manipulator 216 is oriented to remove or place a label on a shelf edge 118. FIG. 3B illustrates a front view of the manipulator 216, the front being the portion of the manipulator 216 configured to contact the shelf edge 118.

The manipulator 216 includes a base wall 300 with a seal 304 extending along the perimeter of the base wall 300. The seal 304 can be fabricated of a flexible material, such as rubber, silicone or the like, to deform upon contact with a shelf edge 118. In operation, the base wall 300 is placed substantially parallel to the shelf edge 118. When the manipulator 216 is extended towards the shelf edge by the effector assembly 104, the seal 304 is configured to engage the shelf edge 118 to create a substantially sealed cavity around a portion of the shelf edge 118, defined by the seal 304 and the base wall 300. In such an embodiment, as shown in FIG. 3B, a height dimension H1 along the perimeter of the seal 304 is substantially equal to the height H2 of the shelf edge 118 so as to create a sealed cavity around a portion of the shelf edge 118 (see also FIG. 8A). As shown in FIGS. 3A and 3B, the image sensor 270 and the pressures sensor 266 are disposed within the base wall 300. The image sensor 270, therefore, captures images depicting portions of the environment toward which the manipulator 216 is currently oriented. The pressure sensor 266 is enabled to measure the air pressure within the above-mentioned cavity. In some examples, an air-permeable wall 306 (e.g. a mesh) may be disposed across the opening at the front of the seal 304, to prevent labels from entering the cavity defined by the seal 304, which prevents the labels from entering and/or otherwise obstructing the air conduit 308 and protects the sensors 266, 270.

Also shown in FIGS. 3A and 3B is an air conduit 308 connecting the manipulator 216 with the pressure generator 228. The air conduit 308 is shown as being disposed within the effector assembly 104, but in other embodiments can be disposed on an exterior surface of the effector assembly 104. The conduit 308 is configured to transmit pressurized air or vacuum from the generator 228 to the manipulator 216, for use in retaining or expelling a label sealed abutting the front of the seal 304.

Figure 4:
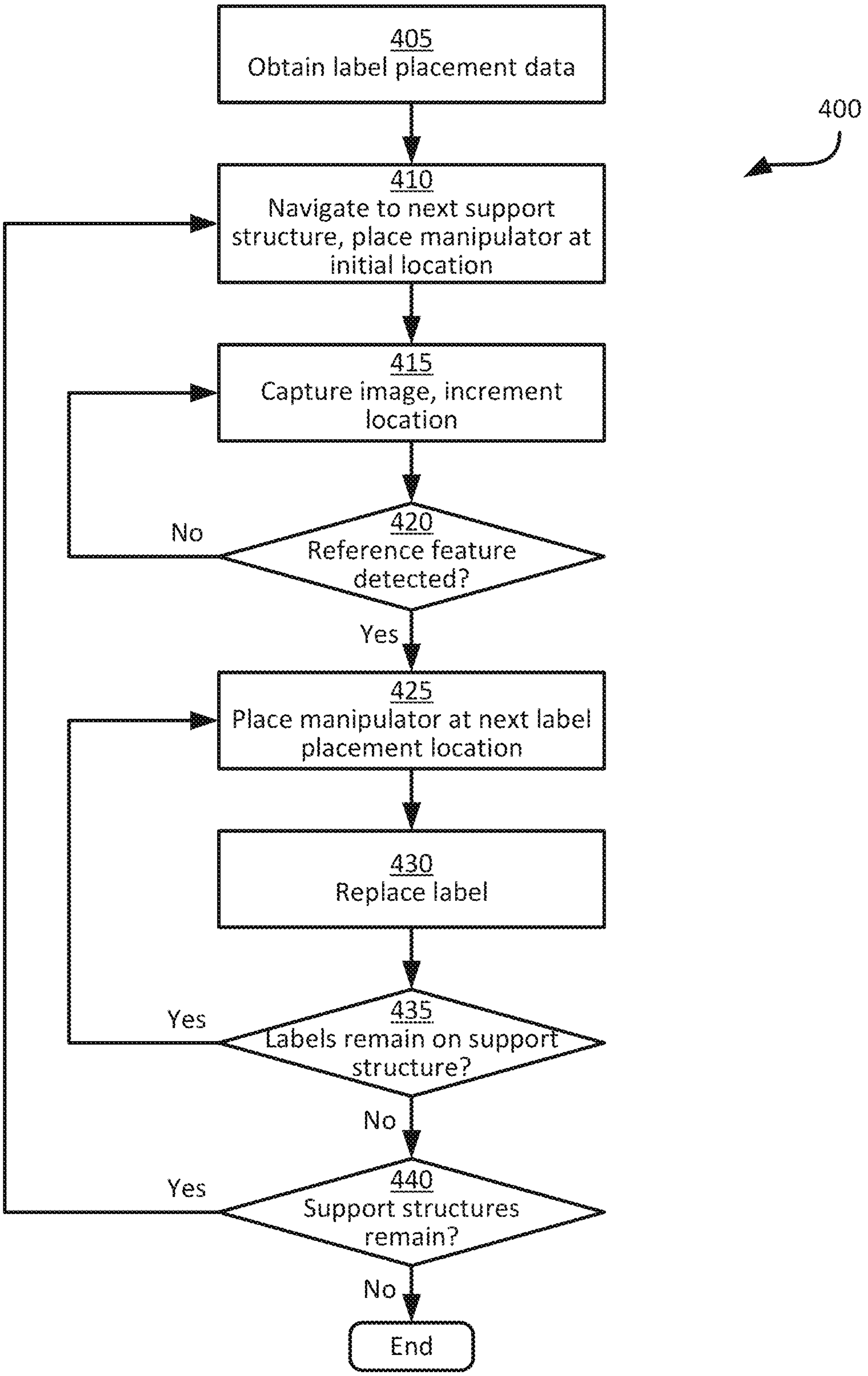
FIG. 4 is a flowchart of a method for labeling support structures.

The functionality of the apparatus 103, as implemented via execution of the application 258 by the processor 250 will now be described in greater detail, with reference to FIG. 4. FIG. 4 illustrates a method 400 of labeling support structures, which will be described in conjunction with its performance in the system 100, and in particular by the apparatus 103, with reference to the components illustrated in FIGS. 2A, 2B, 3A and 3B.

At block 405, the apparatus 103 is configured to obtain label placement data. The label placement data can be obtained from the server 101 over the link 107 or via the dock 108. In other examples, the label placement data can be received from the client device 105. The label placement data defines at least one location in the facility for performance of a label manipulation operation, such as replacement of a previous label at the location with a new label, placement of a label in a previously unlabeled location, or removal of a previous label, without replacement of the label. In the present example, the locations are locations on the shelf edges 118 of the shelf modules 110. Further, in the present example, the locations are defined relative to a reference feature on the support structure. More specifically, each label replacement location is defined as an offset distance along a shelf edge 118 of a shelf module 110. The offset distance is defined from a side of the module 110 (e.g. the leftmost side of the module 110, also referred to as the boundary of the module 110). In other examples, various other reference features can be employed to define the locations in the label placement data, such as machine-readable markers (e.g. physical features of the shelf, graphical indicators such as QR codes, or the like) along the shelf edges, ends of a shelf edge 118 within the boundaries of a module 110 (e.g. when a shelf edge 118 does not extend along the full length 119 of the module 110), and the like.

Figure 5:
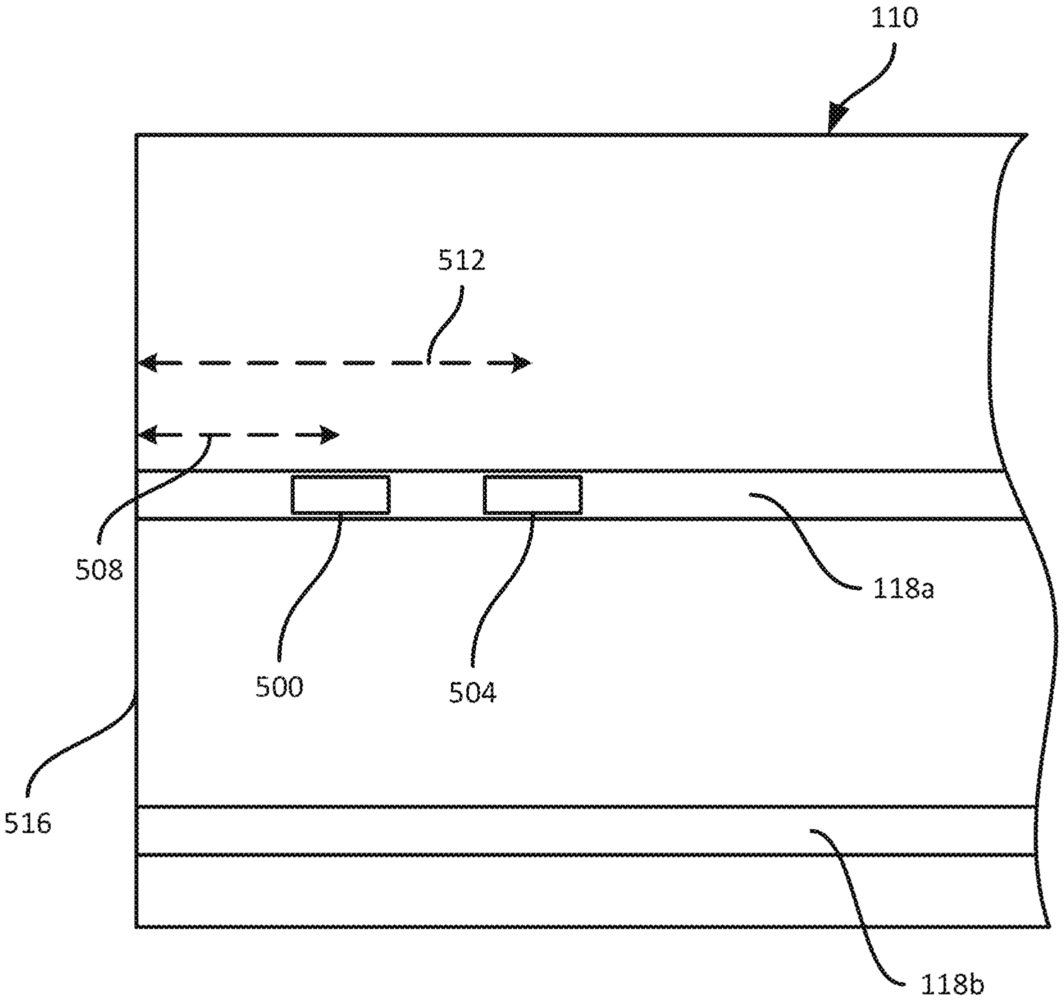
FIG. 5 illustrates a support structure bearing labels for replacement through the method of FIG. 4.

Turning briefly to FIG. 5, a portion of an example shelf module 110 having upper and lower shelf edges 118*a* and 118*b*, respectively, is shown. The shelf edge 118*a* bears labels 500 and 504. The label 500 is at an offset 508 from a reference feature, in the form of a module boundary 516 (in the present example, the left side of the module 110), while the label 504 is at an offset 512 from the reference feature. The offsets 508 and 512, as well as indications of which shelf edge 118 the labels 500 and 504 are affixed to, can be stored in the repository 120 and obtained by the apparatus 103 at block 405, for storage in the repository 260. The label placement data obtained at block 405 therefore contains, in the present example, an identifier of a shelf module 110, an identifier of a shelf edge 118 of the identified module 110, and an offset distance along the identified shelf edge 118, from a predetermined reference feature of the identified module 110. The label placement data can also include label generation data, such as an image for printing on label substrate, or a product identifier permitting the apparatus 103 to retrieve or generate such a label image. In some examples, the label placement data obtained at block 405 can also include an indication of the previous label to be replaced (e.g. a product identifier or the like). Table 1, below, illustrates example label placement data obtained at block 405.

TABLE 1

Example Label Placement Data

| Module | Shelf edge | Offset (mm) | Label Format | Product ID |
|---|---|---|---|---|
| 110 | 118a | 150 | 1" × 3" | 765554 |
| 110 | 118a | 165 | 1" × 3" | 778633 |
| . . . | | . . . | . . . | . . . |

As shown above, for each label to be replaced, a location is provided (defined by the module and shelf edge identifiers, as well as the offsets). Label generation data, in the example above, includes an identification of a label format, which may specify both the size of the label as above, and the arrangement of information on the label (not shown above). The product identifiers are employed by the apparatus 103 to retrieve information with which to populate the label format for generation of the label.

Returning to FIG. 4, at block 410 the apparatus 103 is configured to navigate to the next support structure (e.g. the next module 110) identified in the label placement data. Navigation is performed via suitable mechanism, such as via the use of the above-mentioned map, navigational sensors of the apparatus 103, and the like. In the present example, the apparatus 103 is configured to navigate to a predetermined location relative to the module 110. For example, modules 110 may have lengths of about 1.5 m (other module lengths are also contemplated, for example from about 1 m to about 2 m), and the effector assembly 104 may have a reach of about 1 m.

Figure 6A:
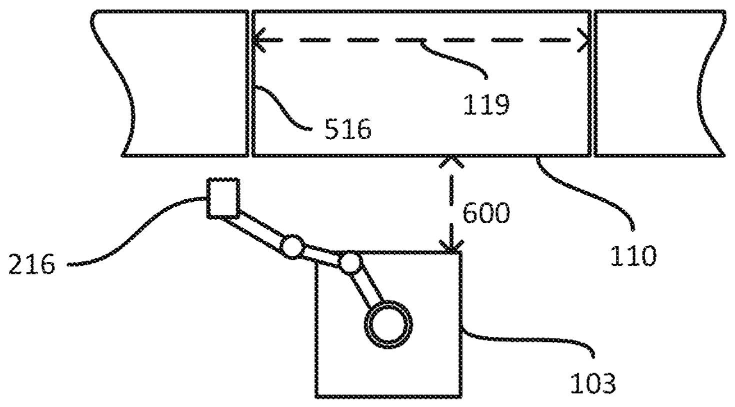
FIGS. 6A and 6B depict detection of support structure reference features during performance of the method of FIG. 4.

Thus, the apparatus 103 is configured to navigate to a position at a predefined depth relative to the module 110, approximately half-way along the length 119 of the module 110, from which the effector assembly 104 can reach any portion of the shelf edges 118 of the module 110. FIG. 6A illustrates such a position, with the apparatus 103 having arrived at a depth 600 relative to the module 110, about half-way along the length 119 of the module. As seen in FIG. 6A, the apparatus 103 is not exactly half-way along the length 119. As will be apparent to those skilled in the art, localization based on inertial sensing (e.g. via accelerometers and gyroscopes), as well as localization based on odometry (e.g. via a wheel encoder coupled to the locomotive mechanism 203) may suffer from navigational errors, and the internal localization maintained by the apparatus 103 may therefore not align exactly with the true position of the apparatus 103 within the environment.

Returning to FIG. 4, at block 410 the apparatus 103 is also configured to place the manipulator 216 at an initial location, from which detection of the above-mentioned reference feature will be initiated. Positioning of the manipulator 216 is achieved via control of the effector assembly 104, for example by issuing commands from the processor 250 to the effector assembly 104 specifying coordinates (e.g. X, Y, Z coordinates and roll, pitch and yaw angles) that define a position and orientation of the manipulator 216 relative to the chassis 200. The effector assembly 104 includes positional sensors (not shown) configured to track the position of the second end (i.e. the manipulator 216) of the effector assembly 104 relative to the first end 212, enabling the effector assembly 104 to position the manipulator 216 responsive to the above-mentioned commands from the processor 250.

The initial location is selected based on the known position (in the frame of reference 102) of the shelf edge 118 identified in the label placement data, as well as on the predetermined position to which the apparatus 103 navigated at block 410, and on a navigational error boundary. For example, the navigational error mentioned above may have been previously characterized as reaching a maximum of about 0.1 m. Further, the height of the apparatus 103 and of the first end 212 of the effector assembly 104 on the apparatus 103 are previously determined, as is the height of the shelf edge 118*a* identified in the label placement data shown above. In the present example, the reference feature is the boundary 516, and the apparatus 103 is therefore configured to control the effector assembly 104 to place the manipulator 216 at an initial location at the height of the shelf edge 118*a*, at a horizontal position adjacent to the boundary 516. As a result of the potential for a positional error of up to 0.1 m, the manipulator 216 may be placed at a distance parallel to the length 119 of about 0.85 m (half of the length 119 plus the maximum potential navigational error of 0.1 m).

Returning to FIG. 4, at block 415 the apparatus 103 is configured to control the image sensor 270 to capture an image. As shown in FIG. 6A, the manipulator 216 is positioned to orient the image sensor 270 towards the module 110. The image captured at block 415 therefore depicts a portion of the shelf edge 118*a* identified in the label placement data. At block 420 the apparatus 103 is configured to determine whether the reference feature is detected in the image captured at block 415. When the determination is negative, the apparatus 103 is configured to repeat the performance of blocks 415 and 420, incrementing the location of the manipulator 216 along the shelf edge 118*a* for each image capture. In other words, in the present example, in which the labels are affixed to substantially horizontal shelf edges 118, each incremental movement of the manipulator 216 at block 415 maintains the manipulator 216 at a predetermined height (e.g. the height of the shelf edge 118*a* as specified in the repository 120, the repository 260, or the label placement data itself) and changes the horizontal location by a predetermined increment to shift the field of view of the image sensor 270.

Figure 6B:
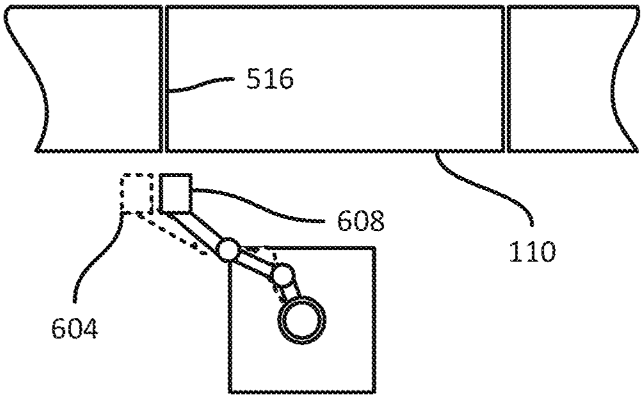
Figure 6C:
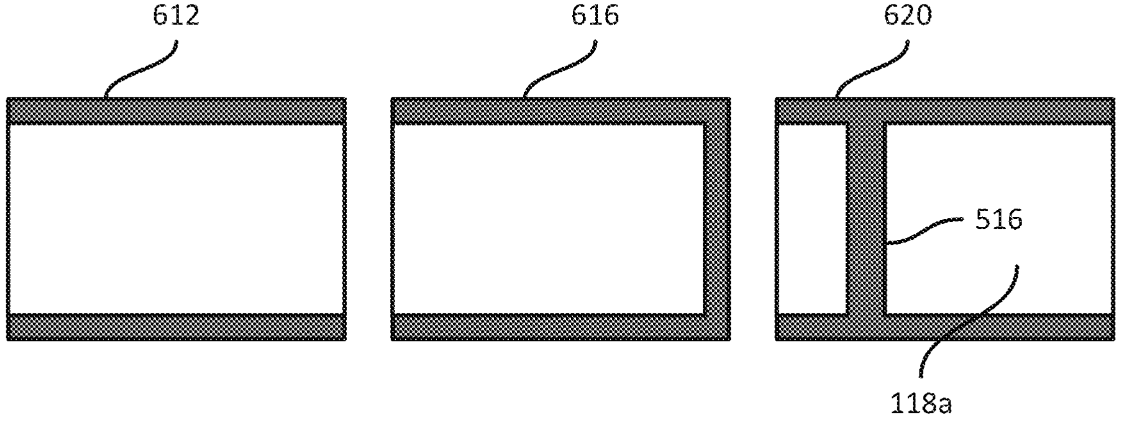
FIG. 6C illustrates example images captured during the detection process illustrated in FIGS. 6A and 6B.

Referring to FIG. 6B, movement of the effector assembly 104 is illustrated, causing the manipulator 216 to traverse a portion of the shelf edge 118 from an initial position 604 (shown in FIG. 6A) to a further position 608. FIG. 6C shows a sequence of three images 612, 616 and 620 captured during the traverse shown in FIG. 6B. The determination at block 420, in the present example, includes determining whether the image captured at block 415 contains a substantially vertical gradient change (e.g. from light, to dark, and back to light) indicative of a gap between modules 110 (which indicates the presence of the module boundary 516). The determination includes the application of a suitable gradient detection operation, edge detection operation or the like. In the example images of FIG. 6C, the image 612 depicts a shelf edge of an adjacent module 110, and does not contain the boundary 516. The image 616 contains a partial representation of the gap between modules 110, but does not contain the boundary 516 (e.g. does not contain the complete dark-light-dark transition mentioned above). The image 620, meanwhile, contains a dark-light-dark transition representing the boundary 516. Responsive to capturing the image 620, therefore, the determination at block 420 is affirmative and the performance of the method 400 proceeds to block 425.

As will now be understood by those skilled in the art, the position of the image sensor 270 is fixed relative to the position of the manipulator 216. In the present example, the image sensor 270 is disposed at the center of the manipulator 216, and thus the position of the image sensor 270 and of the manipulator 216 relative to a shelf edge 118 are equivalent. In other embodiments, the image sensor 270 need not be centered on the base wall 300, but the position of the image sensor 270 relative to the center of the base wall 300 is nevertheless predetermined. Therefore, the location of a reference feature in an image captured by the image sensor 270 indicates the position of the image sensor itself (and therefore the position of the manipulator 216) relative to the reference feature.

At block 425, the apparatus 103 is configured to control the effector assembly 104 to place the manipulator 216 at the next location defined in the label placement data. In other words, having established the position of the manipulator 216 relative to the reference feature following an affirmative determination at block 420, the apparatus 103 is configured to move the effector assembly 104 to place the manipulator 216 at the specified offset relative to the reference feature. Taking the label placement data of Table 1 as an example, at block 425 the effector assembly 104 is controlled to place the manipulator 150 mm to the right (in the orientation shown in FIGS. 5, 6A and 6B) of the boundary 516.

At block 430, the apparatus 103 is configured to replace a label at the location specified in the label placement data. The replacement of a label at block 430 will be discussed in greater detail in connection with FIG. 7. At block 435, the apparatus 103 is configured to determine whether further labels remain to be placed on the current support structure (that is, the current module 110, to which the apparatus 103 navigated at block 410). The determination at block 435 is made with reference to the label placement data obtained at block 405. If all listed labels in the label placement data for the current module 110 have been placed, the determination at block 435 is negative. When the determination at block 435 is negative, the apparatus 103 proceeds to block 440. Otherwise, the apparatus 103 returns to block 425 to place the next label for the current support structure.

At block 440, the apparatus 103 is configured to determine whether support structures other than the current support structure are identified in the label placement data and remain to be processed. In the example data shown in Table 1 above, only one module 110 is identified. In other examples, however, the label placement data can identify label placement locations on a plurality of distinct modules 110. When the determination at block 440 is affirmative, the apparatus 103 returns to block 410 to navigate to the next module 110 in the label placement data. As will now be apparent, during the performance of blocks 415 to 435, the apparatus 103 is configured to remain stationary relative to the current module 110. That is, although the effector assembly 104 and manipulator 216 move, the chassis 200 remains stationary relative to the module 110, thus mitigating or eliminating the accumulation of further navigational errors during the label placement process.

Figure 7:
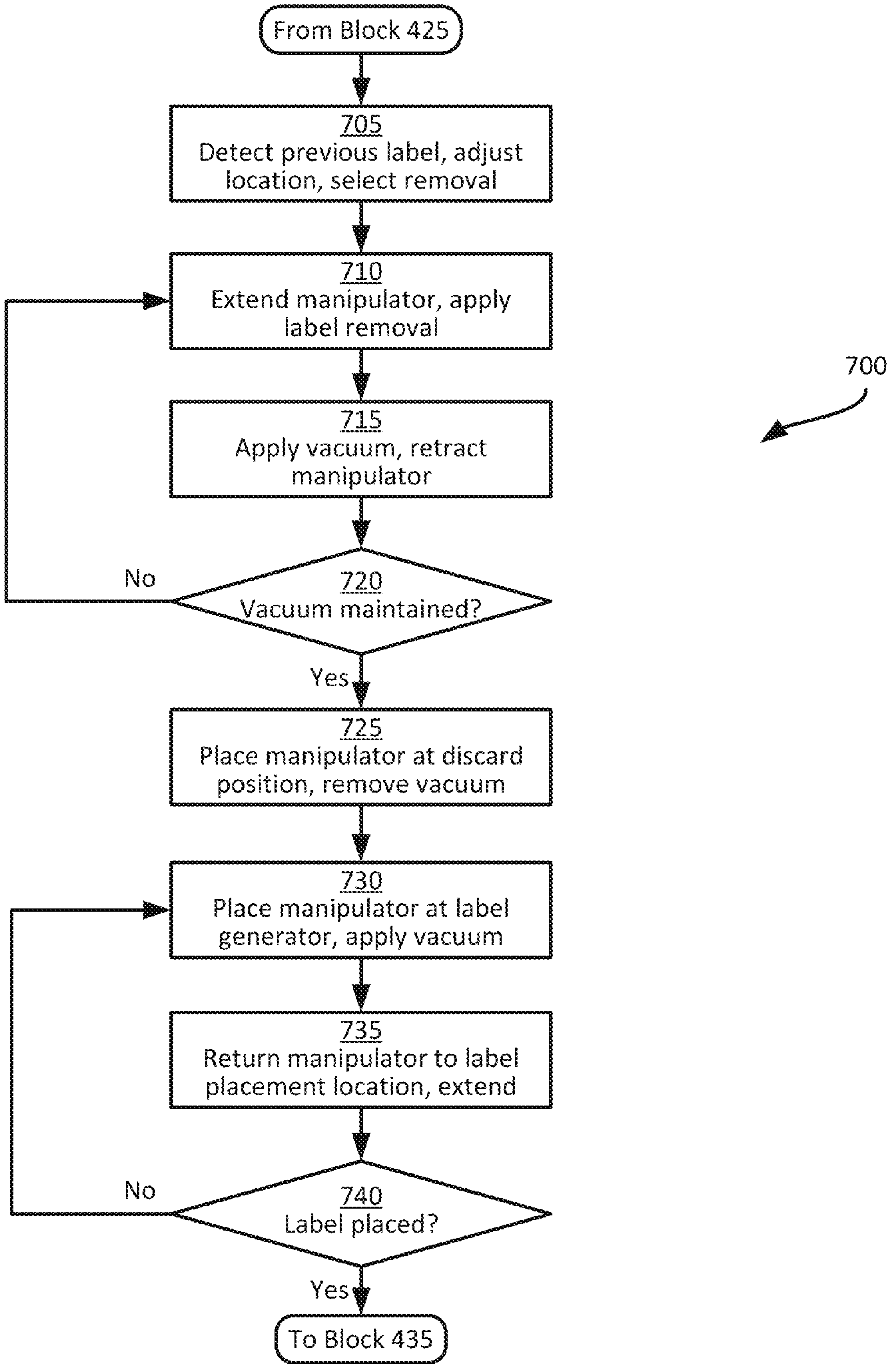
FIG. 7 is a flowchart of a method for label replacement.

Turning now to FIG. 7, the performance of block 430 will be discussed in greater detail. FIG. 7 illustrates a method 700 of label replacement which will be described in conjunction with its performance in the system 100, and in particular by the apparatus 103, with reference to the components illustrated in FIGS. 2A, 2B and 3.

Figure 8A:
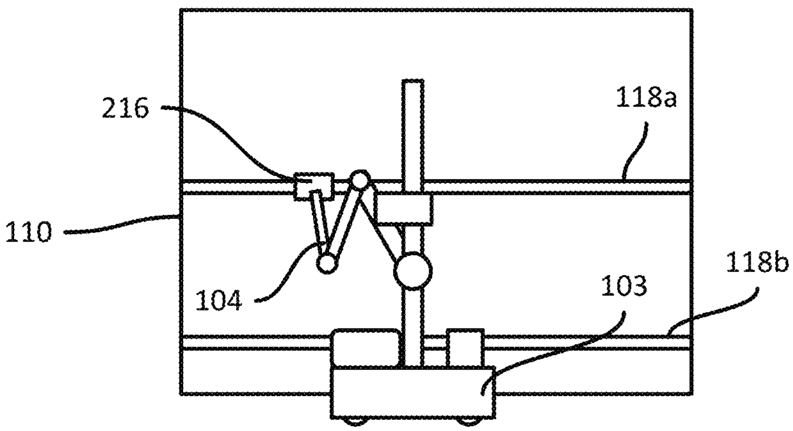
FIGS. 8A-8C illustrate previous label detection at block 705 of the method of FIG. 7.

At block 705, having controlled the effector assembly 104 to place the manipulator 216 at the next label placement location at block 425 as shown in FIG. 8A, the apparatus 103 is configured to detect a previous label at the label placement location. Detection of a previous label is achieved, in the present example, by controlling the image sensor 270 to capture one or more images of the shelf edge 118 from the current location of the manipulator 216 (i.e. the location specified in the label placement data for placement of a label). The processor 250 is configured to process the captured image(s) to detect a label therein. Label detection can be performed via the detection of a barcode or other label features such as strings of text in a captured image, the detection of one or more edge features (e.g. indicated by gradient changes or the like), or a combination of the above.

Figure 8B:
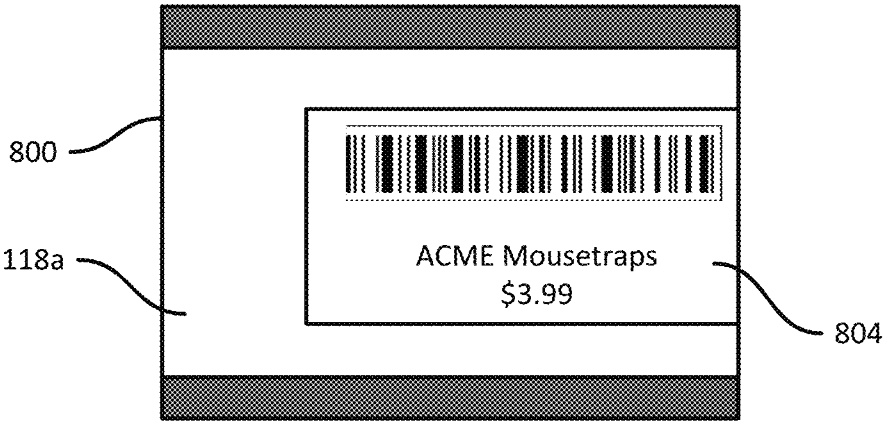
Figure 8C:
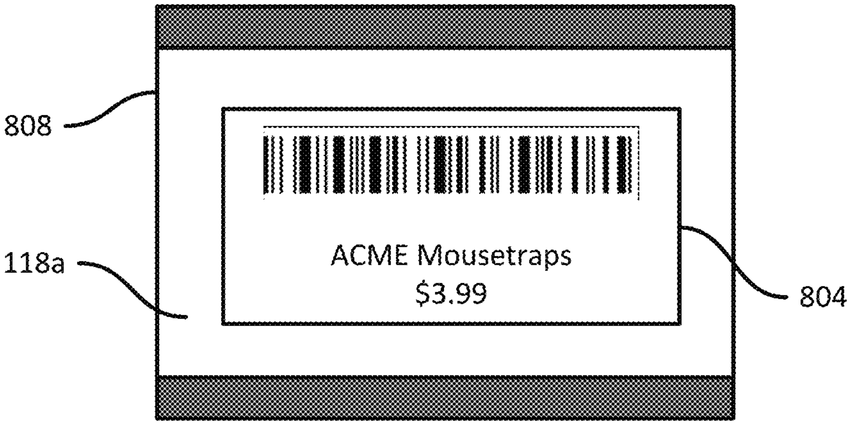

When a partial label is detected in an image captured at block 705, the processor 250 is configured to increment the location of the manipulator 216 to center the manipulator 216 over the partially detected label, and to then capture a further image via the image sensor 270 and repeat the detection. For example, referring to FIG. 8B, an example image 800 captured via the image sensor 270 is shown. The image 800 depicts a portion of the shelf edge 118*a*, and depicts a portion of a previous label 804 affixed to the shelf edge 118*a*. The partial detection of the previous label 804 may indicate that the previous label 804 was not placed exactly at the specified location. To increase the likelihood of successful removal of the previous label 804, the processor 250 can be configured to control the effector assembly 104 to move the manipulator 216 along the shelf edge 118*a* in the direction of the partially detected label 804 and to capture a further image. A further image 808 is shown in FIG. 8C, in which the previous label 804 is fully visible. The processor 250, in other words, detects the previous label 804 as being coincident with the current position of the manipulator 216 and therefore suitable for removal. The processor 250 can also be configured to compare the detected label (e.g. a product identifier decoded from a barcode) to previous label data included in the label placement data. When the previous label detected at block 705 does not match the expected previous label, the processor 250 can be configured to store an error message in the memory 254.

At block 705, the processor 250 can also be configured to select a removal mechanism for the previous label 804. In the embodiment illustrated in FIGS. 2A and 2B, the apparatus 103 is equipped with a single removal mechanism (heated air, delivered via the generator 228 and the heater 262). In other examples, however, as noted above, additional removal mechanisms may be deployed on the apparatus 103 (e.g. ultraviolet light). The selection at block 705 can be based on the label 804 itself. For example, the label placement data or other data in the repository 260 can contain indications of suitable removal mechanisms for each label format, or for particular product identifiers. In other examples, such data is maintained in the repository 120, and the apparatus 103 transmits a request (e.g. containing the image 808 itself, a product identifier decoded from the barcode on the label 804, or the like) for a removal mechanism to the server 101.

Figure 9A:
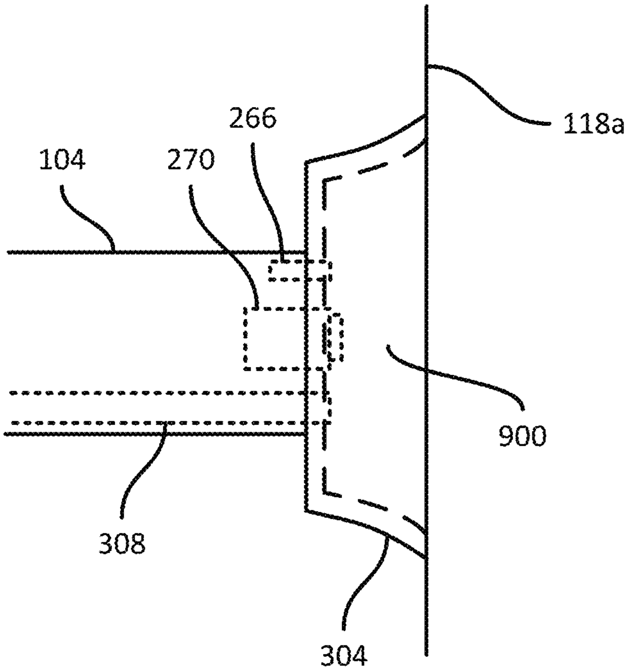
FIG. 9A illustrates the label manipulator of FIGS. 3A and 3B in an extended configuration.

Following detection of the previous label 804 at block 705, the apparatus 103 is configured, at block 710, to extend the manipulator 216 towards the shelf edge 118 and to apply the selected removal mechanism. Extension of the manipulator 216 is performed to bring the seal 304 into contact with one or both of the shelf edge 118*a* and the previous label 804. The processor 250 is configured to control the effector assembly 104 to extend the manipulator 216 towards the shelf edge 118*a* until, for example, one or more sensors (e.g. strain gauges or the like) in the effector assembly 104 register a threshold resistance indicating that the seal 304 has contacted the shelf edge 118*a*. Turning to FIG. 9A, the manipulator 216 is shown following extension to contact the shelf edge 118*a*. As shown in FIG. 9A, the seal 304 has deformed against the shelf edge 118*a* to form the previously mentioned cavity, indicated at 900.

Responsive to extending the manipulator 216, the processor 250 is configured to apply the selected removal mechanism. In the present example, the processor 250 is configured to control the generator 228 to emit pressurized air into the conduit 308 for emission into the cavity 900, and to enable the heater 262 to heat the above-mentioned pressurized air. Heated air can be applied to the cavity (and therefore to the previous label 804 within the cavity 900) for a predetermined period of time, or until a thermal sensor (not shown) in the manipulator 216 indicates that the previous label 804 has reached a predetermined temperature (e.g. beyond which an adhesive affixing the label 804 to the shelf edge 118*a* is expected to soften). An example of such a predetermined temperature is a temperature of about 60 degrees Celsius (140 degrees Fahrenheit)

Returning to FIG. 7, at block 715 the processor 250 is configured to interrupt application of the removal mechanism and to apply a vacuum to the cavity 900 before retracting the manipulator 216 from the shelf edge 118*a*. In the present example, the processor 250 is configured to disable the heater 262 and to control the generator 228 to apply a vacuum to the cavity 900 via the conduit 308. As will now be apparent, the vacuum applied to the cavity 900 serves to secure the previous label 804 to the seal 304. Retraction of the manipulator 216 then serves to remove the previous label 804 from the shelf edge, the adhesive securing the previous label 804 having been softened by the application of heat at block 710.

At block 720, the processor 250 is configured to determine whether a vacuum is maintained within the cavity 900 after retraction of the manipulator 216 (e.g. to a depth from the module 110 as shown in FIG. 6B). The determination at block 720 is made by receiving sensor data from the pressure sensor 266 and comparing the sensor data to a threshold to determine whether the cavity 900 remains under negative pressure (i.e. remains closed at the seal 304 by the label 804), or whether the cavity 900 is open, indicating that the label 804 has not been removed from the shelf edge 118*a*. When the determination at block 720 is negative, the apparatus 103 is configured to repeat the performance of block 710. When the determination at block 720 is affirmative, the processor 250 is configured to proceed to block 725.

At block 725, the processor 250 is configured to control the effector assembly 104 to place the manipulator 216 adjacent to the receptacle 220. The receptacle 220 is affixed to the chassis 200, and therefore has a predetermined position relative to the first end 212 of the effector assembly 104. The processor 250 is therefore configured to issue a command to the effector assembly 104 to place the manipulator 216 at the above-mentioned predetermined position, and to remove the vacuum from the manipulator 216. Removal of the vacuum, as will now be apparent, permits the previous label 804 to fall into the receptacle 220. In some examples, the removal of the vacuum can be supplemented with application of pressurized air into the manipulator 216 to expel the label 804.

At block 730, the processor 250 is configured to control the effector assembly 104 to place the manipulator 216 at an outlet of the label generator 224. For example, a location of the label generator 224 relative to the first end 212 of the effector assembly 104 can be stored in the memory 254 and transmitted to the effector assembly 104 at block 730. The label generator 224, as noted above, is a label printer in the present example, and is configured to generate a label according to the label placement data responsive to an instruction from the processor 250. The processor 250 is further configured to apply a vacuum to the manipulator 216 at block 730, for example responsive to a signal from the label generator 224 indicating that generation of the new label is complete. In other examples, the vacuum is applied responsive to detection of the new label at the outlet of the label generator 224 in an image captured by the image sensor 270.

As will now be apparent, when no previous label is detected at block 705 (e.g. when no partial detection is registered after a threshold number of incremental movements of the manipulator 216), the performance of the method 700 can skip from block 705 directly to block 730.

Responsive to obtaining the new label from the label generator 224 at block 730 (which can be confirmed via a vacuum assessment as described in conjunction with block 720), at block 735 the processor 250 is configured to reposition the manipulator 216 to the label placement location defined in the label placement data (i.e. the initial location referred to in connection with block 705 and shown in FIG. 8A). The processor 250 is then configured to extend the manipulator 216 towards the shelf edge 118*a* as shown in FIG. 9A, and to apply pressurized air to the manipulator 216 via control of the generator 228. The extension of the manipulator 216 to contact the shelf edge 118*a*, in combination with the pressurized air, presses the new label against the shelf edge 118*a* to affix the new label to the shelf edge 118*a* (via adhesive on the back of the new label).

Figure 9B:
FIG. 9B illustrates an image captured by the label manipulator of FIGS. 3A and 3B following placement of a new label.

At block 740, the processor 250 is configured to determine whether the new label was successfully placed at block 735. For example, the processor 250 can be configured to retract the manipulator 216 from the shelf edge 118*a* and control the image sensor 270 to capture an image of the shelf edge 118*a*. When the image contains a label, detected via the mechanisms mentioned above in connection with block 705, the determination at block 740 is affirmative, and the apparatus returns to block 435 of the method 400. FIG. 9B illustrates an image 904 captured at block 740, and showing that a new label 908 has been successfully affixed to the shelf edge 118*a*.

When the determination at block 740 is negative, the new label is assumed to have fallen from the manipulator 216 or the shelf edge 118*a*, and the apparatus 103 returns to block 730 to obtain another copy of the new label from the label generator 224.

Figure 10:
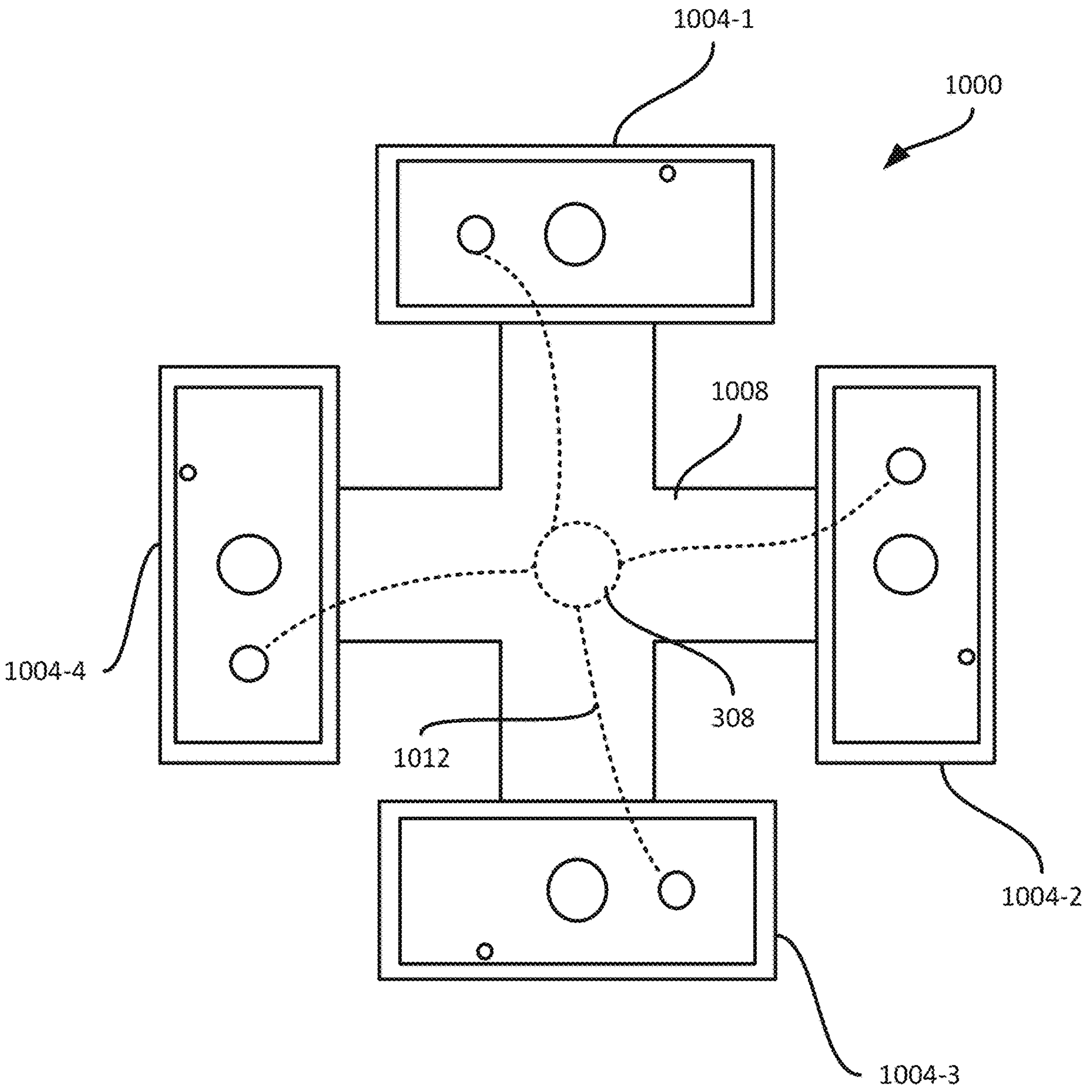
FIG. 10 illustrates a label manipulator set according to a further embodiment.

Variations to the above systems and methods are contemplated. For example, in some embodiments the effector assembly 104 carries a plurality of manipulators 216. Turning to FIG. 10, a front view of a manipulator set 1000 is shown, including manipulators 1004-1, 1004-2, 1004-3, 1004-4 supported by a central manipulator housing 1008 disposed on the second end of the effector assembly. The housing 1008 is rotatable relative to the effector assembly (e.g. via a suitable motor included within the effector assembly 104 and controllable by the processor 250), to place any one of the manipulators 1004 against a shelf edge 118*a*. The above-mentioned conduit 308 travels to the housing 1008, and individual conduits 1012 connect the conduit 308 to each manipulator 1004. The conduits 1012 are individually controllable, e.g. via a set of valves in the housing 1008. When the manipulator set 1000 is deployed, the apparatus 103 can be configured to repeat blocks 705-720 for a plurality of label locations (one location per manipulator 1004) to remove a plurality of labels. The plurality of previous labels can then be discarded at block 725, and a plurality of new labels can be collected at block 730 (e.g. by rotating the housing 1008 to successively place each manipulator 1004 at the outlet of the label generator 224). The apparatus 103 is then configured to repeat the performance of blocks 735 and 740 for each collected label. Thus, the travel of the manipulator 216 from the shelf edge 118*a* to the receptacle 220, to the label generator 224, and back to the shelf edge 118*a*, need only be performed once for each set of labels equal in number to the number of manipulators 1004 in the set 1000.

Further variations are also contemplated. For example, the manipulator 216 can include a mechanical removal mechanism suitable for direct contact with a label, such as a scraper.

In further embodiments, the performance of block 410 of the method 400 includes only placement of the manipulator 216 at an initial location, without navigating to a support structure. In such embodiments, the apparatus 103 may lack a controllable locomotive mechanism, and may instead be moved to the support structure by an operator. Following arrival at the support structure, the operator may activate an input on the apparatus 103 to initiate the performance of block 410 (that is, the control of the manipulator 216).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus for labeling support structures, comprising:

a chassis having a locomotive assembly;

a label generator supported on the chassis;

an effector assembly having a first end coupled to the chassis and a second end movable relative to the chassis;

a label manipulator disposed at the second end of the effector assembly, the label manipulator including an image sensor;

a controller coupled to the locomotive assembly, the label generator, the effector assembly and the label manipulator, the controller configured to:

obtain label placement data defining a location relative to a reference feature on a support structure for a label manipulation operation;

control the locomotive assembly to travel to the support structure;

detect the reference feature via image data captured at the image sensor;

control the effector assembly to place the label manipulator at the location relative to the reference feature;

control the effector assembly and the label manipulator to perform the label manipulation operation.

2. The apparatus of claim 1, wherein the effector assembly is a robotic arm.

3. The apparatus of claim 2, further comprising a mast extending upwards from the chassis; wherein the robotic arm is supported at the first end on the mast.

4. The apparatus of claim 1, wherein the label manipulation operation comprises at least one of (i) removing and discarding a previous label at the location, and (ii) placing a new label at the location.

5. The apparatus of claim 4, wherein the label manipulation operation comprises placing a new label at the location responsive to removing and discarding the previous label.

6. The apparatus of claim 4, wherein the controller is configured to remove and discard the previous label by:

applying a label removal mechanism at the label manipulator; and controlling the effector assembly to place the label manipulator at a discard location to discard the previous label.

7. The apparatus of claim 6, further comprising a receptacle supported on the chassis; wherein the discard location corresponds to an inlet of the receptacle.

8. The apparatus of claim 6, further comprising:

a pressure generator configured to selectively generate pressurized air and a vacuum, for application via an outlet of the label manipulator; and a heater configured to heat the pressurized air;

wherein the controller is configured to apply the label removal mechanism to the support structure and control the pressure generator to generate the pressurized air and control the heater to heat the pressurized air.

9. The apparatus of claim 8, wherein the controller is further configured to remove and discard the previous label by:

after applying the label removal mechanism to the support structure, and prior to controlling the effector assembly to place the label manipulator at the discard location, applying a vacuum via the outlet to secure the previous label to the label manipulator.

10. The apparatus of claim 8, wherein the label manipulator includes:

a base wall defining the outlet;

a seal extending from a perimeter of the base wall to define a cavity adjacent to the base wall; and wherein the image sensor is disposed within the base wall.

11. The apparatus of claim 1, wherein the support structure includes a shelf module including a label-bearing shelf edge; and wherein the reference feature is a boundary of the shelf module; and wherein the controller is configured to detect the reference feature by:

controlling the effector assembly to position the label manipulator at an initial location relative to the shelf module;

capturing, via the image sensor, an image of the shelf module; and detecting the module boundary in the image.

12. The apparatus of claim 11, wherein the controller is further configured to detect the module boundary in the image by detecting a sequence of gradient changes in the image.

13. A method for labeling support structures, comprising:

at a controller of an apparatus including a chassis supporting (i) a locomotive assembly, (ii) a label generator, (iii) an effector assembly having a first end coupled to the chassis and a second end movable relative to the chassis and (iv) a label manipulator disposed at the second end of the effector assembly and including an image sensor:

obtaining label placement data defining a location relative to a reference feature on a support structure for a label manipulation operation;

controlling the locomotive assembly to travel to the support structure;

detecting the reference feature via image data captured at the image sensor;

controlling the effector assembly to place the label manipulator at the location relative to the reference feature; and controlling the effector assembly and the label manipulator to perform the label manipulation operation.

14. The method of claim 13, wherein controlling the effector assembly and the label manipulator to perform the label manipulation operation comprises controlling the effector assembly and the label manipulator for at least one of (i) removing and discarding a previous label at the location, and (ii) placing a new label at the location.

15. The method of claim 14, wherein controlling the effector assembly and the label manipulator to perform the label manipulation operation comprises controlling the effector assembly and the label manipulator to place a new label at the location responsive to removing and discarding the previous label.

16. The method of claim 14, further comprising, at the controller, controlling the effector assembly and the label manipulator to remove and discard the previous label by:

applying a label removal mechanism at the label manipulator; and placing the label manipulator at a discard location to discard the previous label.

17. The method of claim 16, wherein the discard location corresponds to an inlet of a receptacle supported on the chassis.

18. The method of claim 16, wherein applying the label removal mechanism comprises controlling (i) a pressure generator configured to selectively generate pressurized air and a vacuum, for application via an outlet of the label manipulator and (ii) a heater configured to heat the pressurized air, to generate and heat the pressurized air.

19. The method of claim 18, wherein removing and discarding the previous label further comprises, at the controller:

after applying the label removal mechanism to the support structure, and prior to controlling the effector assembly to place the label manipulator at the discard location, controlling the pressure generator to apply a vacuum via the outlet to secure the previous label to the label manipulator.

20. The method of claim 13, wherein the support structure includes a shelf module including a label-bearing shelf edge; wherein the reference feature is a boundary of the shelf module; and wherein detecting the reference feature comprises, at the controller:

controlling the effector assembly to position the label manipulator at an initial location relative to the shelf module;

capturing, via the image sensor, an image of the shelf module; and detecting the module boundary in the image.

21. The method of claim 20, further comprising, at the controller, detecting the module boundary in the image by detecting a sequence of gradient changes in the image.

* * * * *